July 2, 1963
L. H. WILDBERGER, SR
3,096,427
AUTOMATIC COFFEE MAKER
Filed Nov. 7, 1961
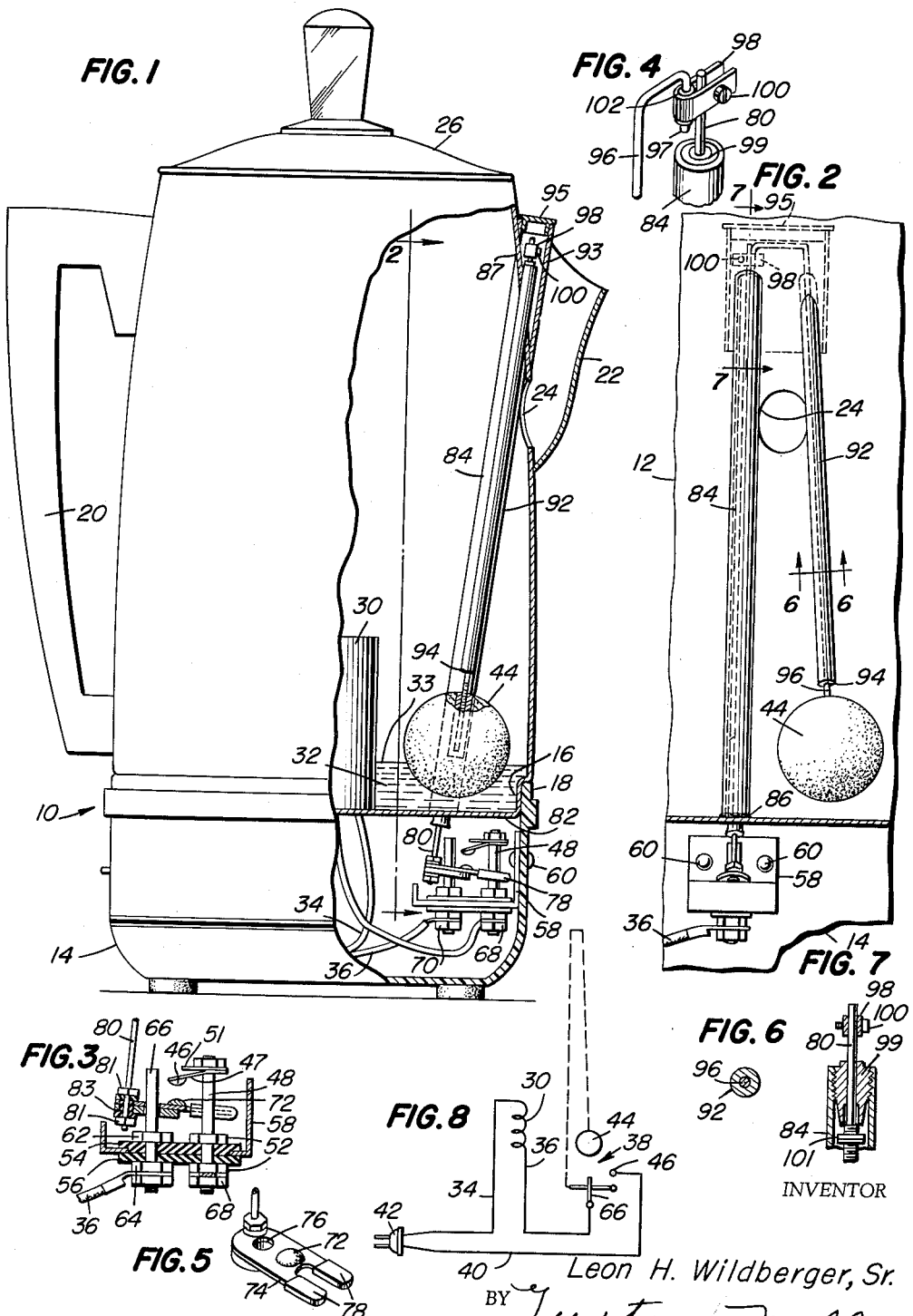
INVENTOR
Leon H. Wildberger, Sr.
BY Gustave Miller
ATTORNEY United States Patent Office 3,096,427
Patented July 2, 1963

3,096,427
AUTOMATIC COFFEE MAKER
Leon H. Wildberger, Sr., P.O. Box 309, Robertsdale, Ala.
Filed Nov. 7, 1961, Ser. No. 150,733
2 Claims. (Cl. 219—44)

This invention relates to an automatic coffee maker and to a beverage float-controlled switch for interrupting the electic heating circuit of the coffee maker.

A further object of this invention is to provide a truly automatic coffee maker, a coffee maker that will continue to maintain heat in the coffee or beverage within the coffee pot or vessel, and which will automatically interrupt the electric circuit to the electric heating element of the coffee pot as soon as the level of the beverage in the coffee pot falls below a safe minimum, thus avoiding any possibility of burning out or ruining the coffee pot by maintaining heat therein when no beverage is present.

A further object of this invention is to provide an improved combination coffee pot and float-controlled switch which will be positively reliable in operation and which will automatically cut off the circuit when enough beverage has been removed from the pot to make it inadvisable to maintain heat therein any longer.

Still a further object of this invention is to provide an automatic hot beverage pot which is electrically heated with a circuit interrupting switch operated by a float which interrupts the circuit when the beverage level drops below a safe minimum.

A further object of this invention is to provide a beverage float operated switch mechanism which is insulated against danger of short circuiting therethrough.

Still a further object of this invention is to provide the combination of a coffee pot and a beverage level indicator which has the additional feature of actuating a switch in the circuit to the heating element thereof to interrupt the circuit when the beverage level indicator indicates that the beverage level has dropped to below a safe minimum level, thus insuring that the heating element will discontinue operation and avoid danger of burning out when there is not sufficient beverage in the pot to absorb the heat.

With the above and related objects in view, this invention consists in the details of construction and combination of parts, as will be more fully understood from the following description, when read in conjunction with the accompanying drawing, in which:

FIG. 1 is an elevational view, partly in section, showing the automatic beverage maker of this invention.

FIG. 2 is a front elevational view, partly in section, showing the float and float connection to the switch, on line 2—2 of FIG. 1.

FIG. 3 is an elevational view, partly in section, of the switch elements, on a somewhat larger scale than in FIG. 1.

FIG. 4 is a perspective view of the connection between the tops of the float rod and the switch control lift rod.

FIG. 5 is a perspective view of the vertically movable contact element.

FIG. 6 is a sectional view through the float rod and float rod tube on line 6—6 of FIG. 2.

FIG. 7 is a sectional view on line 7—7 of FIGS. 2 and 4.

FIG. 8 is a schematic view of the electrical circuit and its control.

There is shown at 10 an electrically heated beverage pot or coffee percolator which includes a beverage pot or vessel 12 mounted on a support base 14 in any conventional manner, as by having a recessed neck and shoulder 16 in the coffee pot supported on an upstanding ledge 18 of the base 14. A conventional handle 20 is provided on one side of the beverage pot or vessel 12, and on the opposite side there is the usual beverage pouring spout 22 connected to the interior of the pot or vessel 12, by the usual beverage discharge aperture 24. A conventional cover 26 is provided on the pot or vessel 12.

Within the beverage pot 12 there is provided a conventional electrical resistance heating element 30 for heating and maintaining heat in the coffee or beverage 32, the level 33 of the beverage 32 depending on the amount of coffee or other beverage being made. The heating element 30 has a pair of circuit lines 34 and 36 connected thereto, the circuit line 36 being connected through the float control switch 38 of this invention and circuit line 40 to a conventional male plug 42 for being plugged into any convenient electrical receptacle. If desired, either circuit line 34 or 40 may be connected through a conventional thermostat or other temperature control means to the resistance heater element 30, such not being shown herein.

The circuit switch 38 is float-controlled, as now about to be described, by means of the position of the float 44, the float 44 being made of any suitable material that will be inert both to the heat of the beverage 32 as well as to the contents of the beverage 32, and that can stand being completely submerged within the beverage 32 without losing any of its floatability, such materials being quite conventional and well known.

The float control switch 38 consists of a resiliently supported fixed contact member 46 at the end of a soft spring 47 secured on the top of a fixed contact rod 48 by means of a nut 50 threaded thereon and a shoulder washer 51 against which it may abut. The lower end of the fixed contact rod 48 is secured by a pair of nuts 52 on a pair of insulating base members 54 and 56 supported on the apertured leg of an L-shaped bracket 58, the L-shaped bracket 58 being secured by rivets or bolts 60 in a conventional manner to a wall of the hollow base 14, as shown.

Mounted on the same insulated base plates 54 and 56 in an identical manner by a pair of spaced nuts 62 and 64 is a movable contact guide rod 66 likewise of conducting material and extending parallel to the fixed contact rod 48. The bottom of the rod 48 has the end of circuit line 40 secured thereto by a nut 68, and the end of circuit line 36 is similarly secured by a nut 70 to the bottom of movable contact guide rod 66.

A movable contact 72 is provided in suitable position on a conductor plate 74 which is apertured at 76 so as to be guided on and slide up and down and make electrical contact with the movable contact rod 66 below the contact 46. Extending from one end of the conductor plate 74 are a pair of fingers insulated as at 78 and extending on opposite sides of the fixed contact rod 48 so that as the movable conductor plate 74 moves up or down on the contact guide rod 66, it is suitably guided in proper position by the insulated fingers 78 extending on opposite sides of the fixed contact rod 48 and the other end of the conductor plate 74 is insulatably secured on the lower end of a lift rod 80 by a pair of nuts 81 and an insulating sleeve and washer 83.

Mounted through the bottom wall 82 of the beverage pot 12 and extending through the side wall thereof, preferably although not necessarily in the spout area as shown, is a hollow tube 84 which is impervious to the beverage 32 and is sealed through the bottom 82 at 86 and through the side wall at 87, so that no liquid in the pot 12 can enter the tube 84. The rod 80 reciprocates freely through tube 84.

The top end of rod 80 in tube 84 extends through a bushing 99 threaded in the top of tube 84, a stop 101 being threadedly adjusted on rod 80 for adjusting the movement of contact 72 (supported by rod 80) to the contact 46. A second tube 92, nickel and chrome plated inside and out, extends substantially parallel to the left rod guiding tube 84 and terminates exteriorly of the coffee pot 12 closely adjacent the exterior end of the tube 84, but the bottom end 94 terminates a suitable distance above the bottom 82 of the beverage pot 12. Extending through this second tube 92 is a similarly plated float rod 96 at whose lower end there is secured, as by being threaded thereon to the float 44 of suitable material inert to both heat and to the composition of the beverage 32. The float rod 96 extends freely through tube 92 and both rod 96 and tube 92 are chromium plated to provide a substantially friction free fit which is resistant to corrosion or staining so that the free movement of the float rod will not be interfered with. The upper end of float rod 96 is bent in a reverse J-hook 97 and is insulatably secured to the upper end of the contact lift rod 80 as by means of a U-clamp 98 and stud screw 100, the hook end 97 of float rod 96 being covered with an insulated sleeve 102 to prevent any electrical connection between lift rod 80 and float rod 96.

To prevent the possibility of beverage from aperture 24 under spout 22 entering the top of either tube 84 or 92, an open top housing 93 may be provided on the exterior of the pot or vessel 12 within the spout area 22, and a removable cap 95 closes the open top of the housing 93, but allows access to the connecting clamp 98 when necessary.

In operation, the pot or vessel 12 is filled with liquid to a desired level for making the beverage 32 and is operated by the usual control (not shown) for controlling the circuit to the heat electric resistance element 30. When the beverage has been properly brewed, such conventional controls may lower but continue to maintain the amount of electricity reaching the heat resistance element 30 and maintain the temperature of the beverage until it is entirely consumed. However, when sufficient beverage has been removed so that the level of the beverage is less than the desired minimum, preferably less than a cup of beverage such as shown at level 33, the float 44 will drop downwardly to the position shown, and as this float 44 drops downwardly due to the lack of support by the beverage level, the float rod, through the connector 98, also moves the lift rod 80 downwardly and thus moves the vertically movable contact 72 away from circuit completing position with the spring supported fixed contact 46, to the position shown in FIGS. 1, 3 and 7, thus interrupting the circuit to the heating element 30 automatically. The contact supporting spring 47 assists gravity in giving rod 80 an initial downward impetus to insure free downward movement thereof to interrupt the circuit. When the float drops, the circuit will be automatically interrupted, thus preventing the probability or possibility of ruining the heat electric resistance element 30, through lack of sufficient beverage to absorb the heat therefrom.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. In combination with a beverage percolator utilizing an electric circuit for maintaining heat therein, a float-controlled switch in said circuit for interrupting said heat maintaining circuit when the beverage level in the percolator drops below a safe minimum, said float-controlled switch comprising a vertically movable contact, a float floatable in the beverage, a float rod connected to said float and to said vertically movable contact, a fixed contact mounted in the vertical path of and above said vertically movable contact whereby the circuit is maintained through said switch only when said float is supported by the beverage in contact lifting position, said fixed contact comprising a horizontally extending contact member, a vertically extending fixed contact rod, insulated support means for said fixed contact rod, a circuit line connected to said fixed contact rod, a contact guide rod for said movable contact mounted on said insulated support means parallel to and spaced from said fixed contact rod, a circuit line connected to said guide rod for said movable contact, said vertically movable contact comprising a conductor plate apertured to slide vertically on said contact guide rod, a contact member on said conductor plate, insulated guide means extending from said conductor plate about said fixed contact rod, said float rod being connected to said conductor plate of said movable contact.

2. The combination of claim 1, said percolator comprising a beverage vessel and a hollow support base for said vessel, said switch being mounted in said base below said vessel, a first tube extending from said hollow base through said vessel to the exterior thereof, a second tube extending from the exterior of said vessel parallel to said first tube and terminating within said vessel above said base, a float in said vessel, a float rod extending through said second tube to the exterior of said vessel, said float being mounted on the lower end of said float rod, means for connecting said float rod to said vertically movable contact plate comprising a lift rod insulatably connected at one end to said contact plate and extending through said first tube to the exterior of said vessel, and means connecting said ends of said rods.

References Cited in the file of this patent

UNITED STATES PATENTS

| 1,352,435 | Dennert | Sept. 14, 1920 |
| 1,901,028 | Green | Mar. 14, 1933 |

FOREIGN PATENTS

| 106,583 | Australia | Feb. 7, 1939 |